(12) United States Patent
Holcomb et al.

(10) Patent No.: US 8,218,396 B2
(45) Date of Patent: Jul. 10, 2012

(54) TORSIONAL ULTRASONIC WAVE BASED LEVEL MEASUREMENT SYSTEM

(75) Inventors: David E. Holcomb, Oak Ridge, TN (US); Roger A. Kisner, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 115 days.

(21) Appl. No.: 12/724,818

(22) Filed: Mar. 16, 2010

(65) Prior Publication Data
US 2011/0228640 A1 Sep. 22, 2011

(51) Int. Cl.
*G01S 15/00* (2006.01)
*G01F 23/00* (2006.01)

(52) U.S. Cl. .......................... 367/99; 367/908; 73/290 V (58) Field of Classification Search ..................... 367/99, 367/908; 73/290 V
See application file for complete search history.

(56) References Cited

U.S. PATENT DOCUMENTS

| | | | |
|---|---|---|---|
| 3,604,529 A * | 9/1971 | Fothergill | 367/151 |
| 3,744,301 A | 7/1973 | Arave | |
| 3,915,018 A * | 10/1975 | Karplus | 73/647 |
| 4,193,291 A | 3/1980 | Lynnworth | |
| 4,893,496 A | 1/1990 | Bau et al. | |
| 5,017,867 A * | 5/1991 | Dumais et al. | 73/290 V |
| 5,253,521 A * | 10/1993 | Abramovich et al. | 73/290 V |
| 5,568,449 A * | 10/1996 | Rountree et al. | 367/99 |
| 5,828,274 A * | 10/1998 | Jen et al. | 333/143 |
| 7,215,118 B2 | 5/2007 | Park et al. | |
| 2007/0169549 A1* | 7/2007 | Kwun et al. | 73/290 V |

FOREIGN PATENT DOCUMENTS
JP 05273033 A * 10/1993

OTHER PUBLICATIONS

W.B. Dress, Torsional Ultrasonic Technique for Reactor Vessel Liquid Level Measurement, Oak Ridge National Laboratory, Ridge, TN 37831, Conference-8310143-63; DE84 003357 (13 pages).

* cited by examiner

*Primary Examiner* — Ian Lobo
(74) *Attorney, Agent, or Firm* — Luedeka Neely Group, P.C.

(57) ABSTRACT

A level measurement system suitable for use in a high temperature and pressure environment to measure the level of coolant fluid within the environment, the system including a volume of coolant fluid located in a coolant region of the high temperature and pressure environment and having a level therein; an ultrasonic waveguide blade that is positioned within the desired coolant region of the high temperature and pressure environment; a magnetostrictive electrical assembly located within the high temperature and pressure environment and configured to operate in the environment and cooperate with the waveguide blade to launch and receive ultrasonic waves; and an external signal processing system located outside of the high temperature and pressure environment and configured for communicating with the electrical assembly located within the high temperature and pressure environment.

8 Claims, 10 Drawing Sheets

TORSIONAL ULTRASONIC WAVE BASED LEVEL MEASUREMENT SYSTEM

GOVERNMENT RIGHTS

This invention was made with government support under Contract No. DE-AC05-00OR22725 awarded by the U.S. Department of Energy. The government has certain rights in the invention.

BACKGROUND

A pressurized water reactor is a type of nuclear power reactor that uses super heated water under high pressure as a coolant to remove heat generated by the reactor. The water used is light or ordinary water. These reactors are used in power stations such as Three Mile Island, and in nuclear powered naval ships and submarines. As part of the operation of such reactors, it is desirable to monitor the coolant level in the reactor. However, the high temperature and pressure environment of such reactors (about 33° C. and 15 MPa) complicates implementation of level measurement devices.

Accordingly, there is a need in the art for an improved level measurement system suitable for use in high temperature and pressure environments, such as exist in pressurized water reactors.

SUMMARY

The disclosure is directed to a level measurement system suitable for use in a high temperature and pressure environment to measure the level of a coolant fluid within the environment. For example, the system is particularly useful for measuring the level of coolant water in pressurized water reactors of the type used in nuclear reactors.

In one aspect, the system is used to measure the level of a volume of coolant fluid located in a coolant region of the high temperature and pressure environment.

An ultrasonic waveguide is positioned within the coolant in the high temperature and pressure environment, and a magnetostrictive electrical assembly is located within the high temperature and pressure environment and is configured to operate in the environment and cooperate with the waveguide to launch and receive ultrasonic waves. That is, the magnetostrictive electrical assembly and the waveguide provide a magnetostrictive transducer that functions to generate an ultrasonic wave that propagates along the waveguide and is reflected back to the transducer through the coolant fluid.

An external signal processing system is located outside of the high temperature and pressure environment and is configured for communicating with the electrical assembly located within the high temperature and pressure environment.

The speed of the ultrasonic waves along the waveguide blade is proportional to the density of the coolant fluid surrounding the waveguide, and the level of the fluid, is obtained by measuring the transit time for the ultrasonic wave to progress along the waveguide and reflect back to the magnetostrictive electrical assembly.

BRIEF DESCRIPTION OF THE DRAWINGS

Further advantages of the invention are apparent by reference to the detailed description when considered in conjunction with the figures, which are not necessarily to scale so as to more clearly show the details, wherein like reference numbers indicate like elements throughout the several views, and wherein.

DETAILED DESCRIPTION

The disclosure relates to an improved level measurement system suitable for use in high temperature and pressure environments, such as exist in pressurized water reactors type nuclear reactors. Level measurement information is useful to monitor conditions associated with cooling of the core of nuclear reactors. Inadequate core cooling, and the failure to observe the same, can be disadvantageous. For example, the Three Mile Island accident of 1979 involved a partial core meltdown of a pressurized water reactor. One factor attributed to the Three Mile Island accident involved an undetected loss of reactor coolant water. The system of the present disclosure is configured for use in such reactors for detecting coolant water levels so that a loss of water may be quickly detected.

Figure 1:
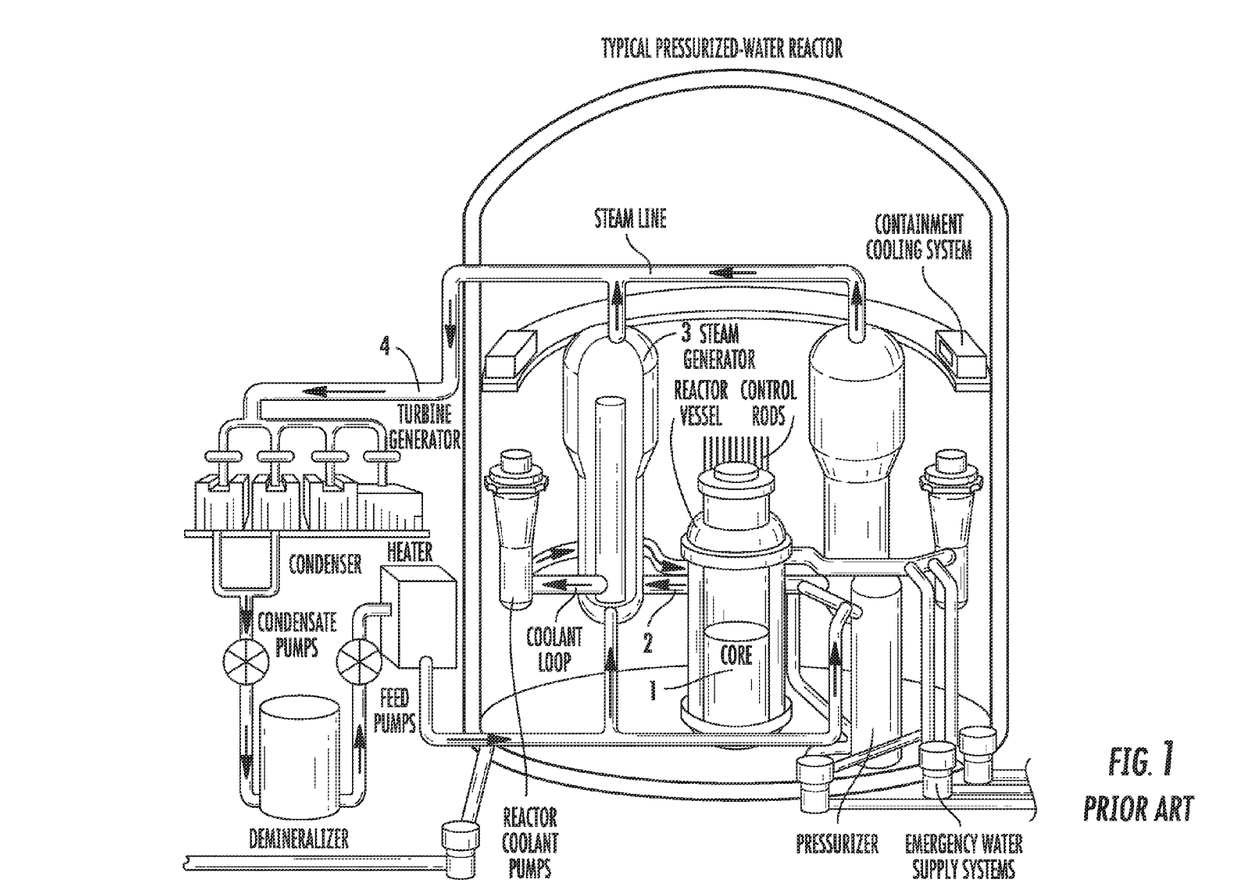
FIG. 1 shows a conventional prior art nuclear power system having a pressurized light-water reactor.

To provide an example of the context of the operating environment of pressurized water reactors, and with initial reference to FIG. 1, there is shown a schematic diagram of a conventional nuclear power system having a pressurized light-water reactor 1. The drawing and description thereof of the basic nuclear power system are available from the U.S. Nuclear Regulatory Commission (www.NRC.gov).

With continued reference to FIG. 1, a core inside the reactor vessel of the reactor 1 creates heat, and pressurized water 2 in a primary coolant loop carries the heat to a steam generator 3. Inside the steam generator, a steam line 4 directs steam to a main turbine, causing it to turn a turbine generator, which produces electricity. The unused steam is exhausted into a condenser where it condensed into water. The resulting water is pumped out of the condenser with a series of pumps, reheated and pumped back to the reactor vessel. The reactor core contains fuel assemblies that are cooled by water circulated using electrically powered pumps.

The coolant water enters the bottom of the reactor core at about 275 C (530° F.) and is heated as it flows upwards through the reactor core to a temperature of about 330° C. (625 F). The water remains liquid despite the high temperature due to the high pressure in the primary coolant loop, usually around 155 bar (15 MPa 150 atm, 2,250 psig). The level measurement systems of the present disclosure will be understood to be configured for use within nuclear reactors, such as the reactor 1, having the described temperature and pressure conditions, and operable for monitoring the level of the coolant water within the reactor.

Figure 2:
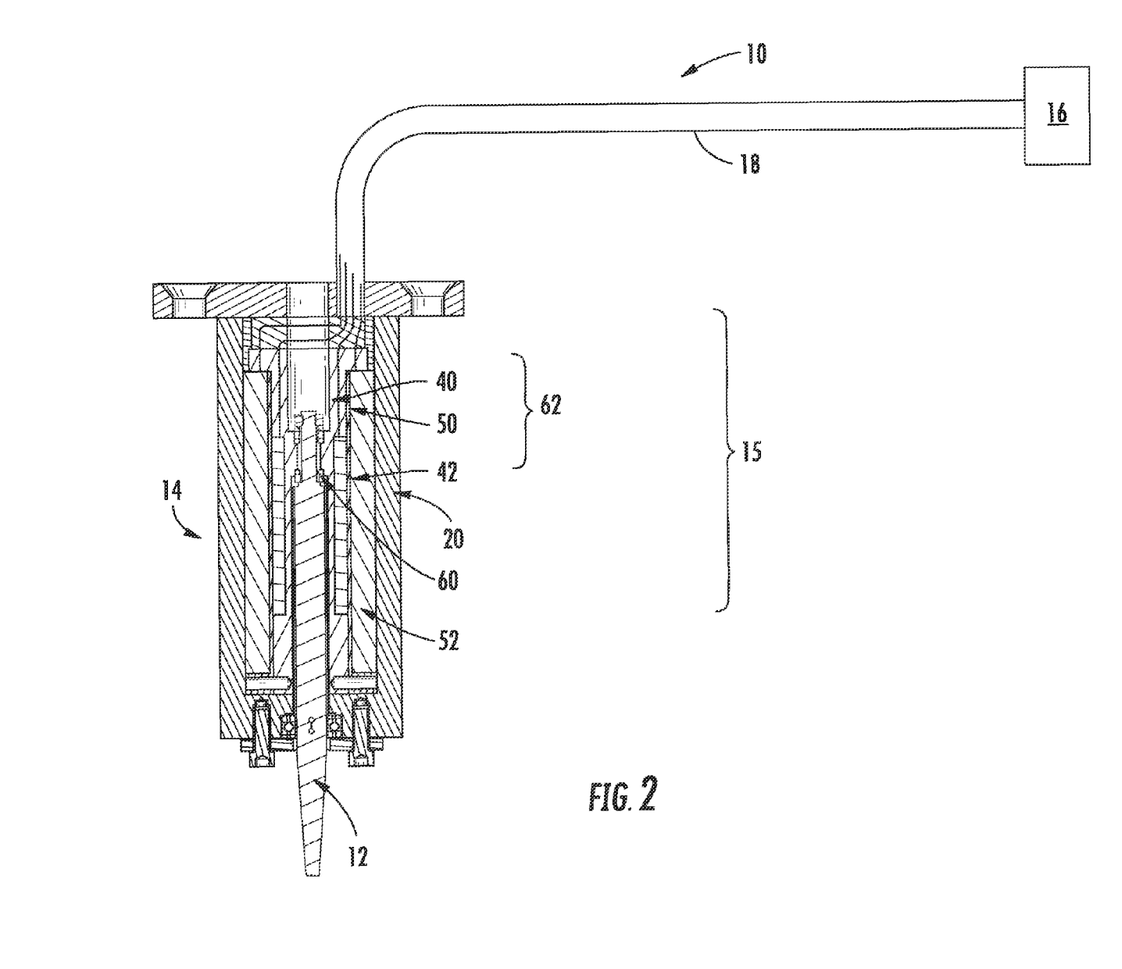
FIG. 2 is a cross-sectional view of a level measurement system according to an embodiment of the disclosure
Figure 3:
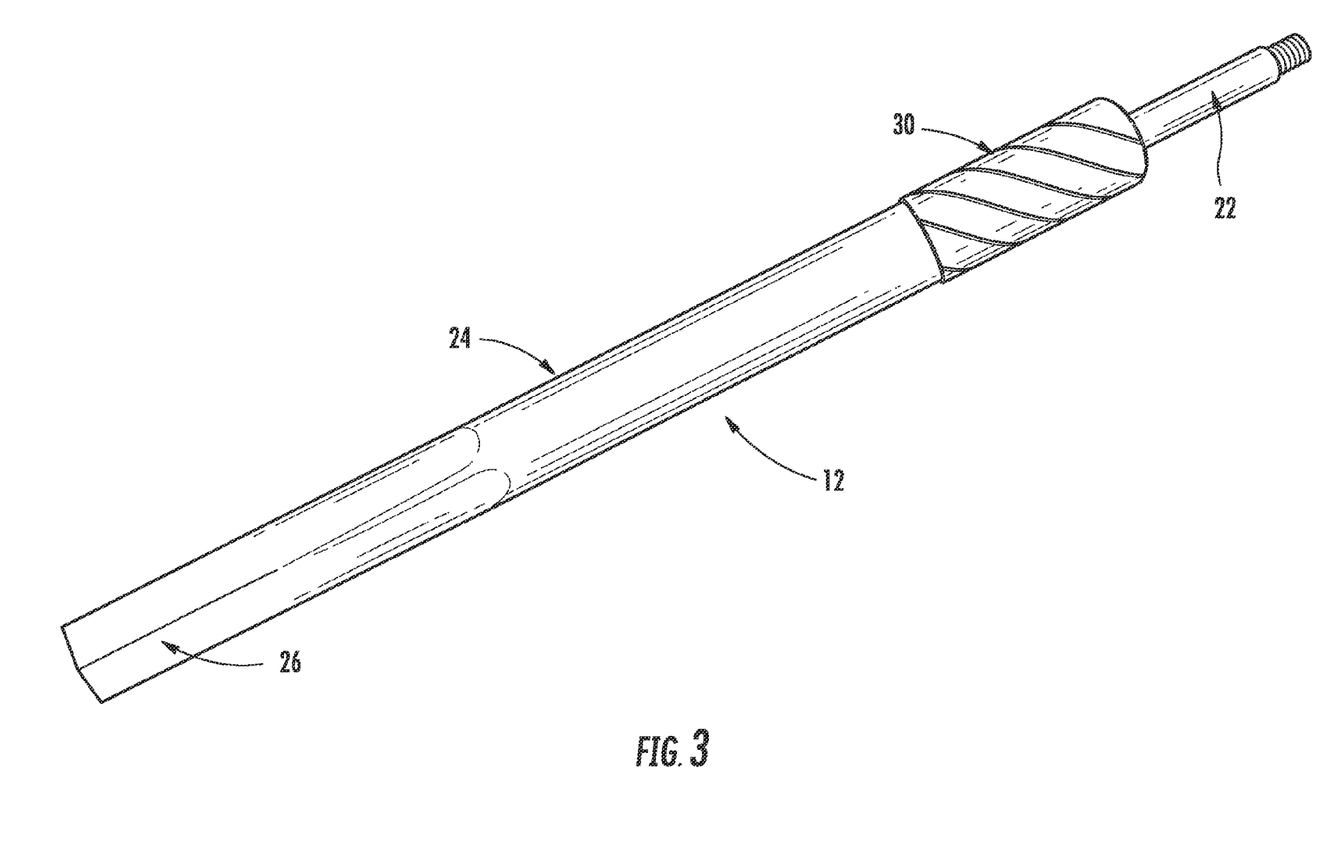
FIG. 3 is a perspective view of a waveguide blade for use in the system of FIG. 2.

Therefore, according to the disclosure, and with reference to FIG. 2, a level measurement system 10 may advantageously be incorporated into a pressurized water reactor, such as the reactor 1 described above, for monitoring coolant level. The system 10 includes, as major components, an ultrasonic waveguide blade 12 that is positioned within a desired measurement region of a reactor, a magnetostrictive electrical assembly 14 also located within the reactor and configured to operate in the reactor environment and cooperate with the waveguide blade 12 to launch and receive ultrasonic waves, and an external signal processing system 16 located outside of the temperature and pressure environment of the reactor and configured for communicating with the electrical assembly 14 located within the reactor. The blade 12 shown in FIG. 3 is not to scale and its length will vary depending on application. A typical length for the blade would be several meters. Length depends on the application and can vary from less than one meter to 10 meters or greater.

Together, the blade 12 and electrical assembly 14 provide a magnetostrictive transducer 15 that functions to generate an ultrasonic wave that propagates along the waveguide blade 12 and is reflected back through the coolant fluid in the reactor. As explained more fully below, the speed of the wave propagation along the waveguide blade 12 is proportional to the density of the coolant water surrounding the waveguide blade 12, and the level of the water. The speed of the torsional wave is obtained by measuring the transit time for the wave to progress down the waveguide blade 12 and reflect back to the transducer 15.

An advantage of the system 10 is that all of the components of the blade 12 and the electrical assembly 14, and hence the transducer 15, are located within the reactor. Of the system 10, only the external signal processing system 16 remains outside of the reactor. The internal electrical assembly 14 and the external processing system 16 are preferably placed in electrical communication with one another by used of a mineral insulated metal sheathed (MIMS) cable 18.

A housing or case 20 is located within the reactor and mounted to an interior surface of the reactor for housing the electrical system 14 and to enable mounting of the system 10 within the reactor and routing of the cable 18 from the interior of the reactor to the exterior of the reactor. Thus, as will be appreciated, a significant aspect of the disclosure is the provision of the transducer 15 that is able to withstand the temperature and pressure conditions of the reactor.

The case 20 is preferably provided by a magnetic stainless steel protective housing, providing cable welding spots, mechanical mounting, electromagnetic shielding, and mechanical protection. For electrical insulation, the entire case 20 apart from the blade 12 is potted into a commercial high-temperature potting compound, such as a potting compound available under the tradename DURALCO 4703 from Cotronics of Brooklyn, New York. Other sealant materials may be used to seal the coil and wiring components, such as a low melting temperature glass.

Figure 4:
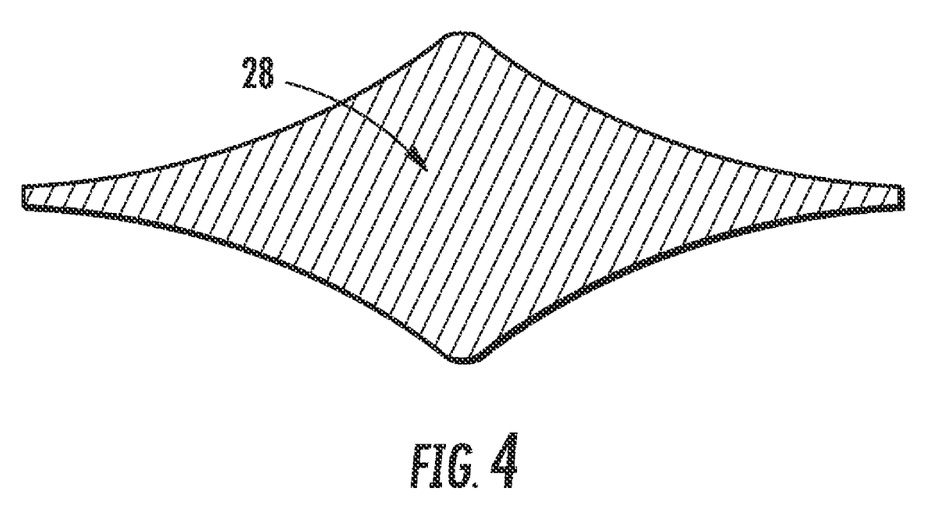
FIG. 4 shows the cross-section of an end section of the waveguide blade of FIG. 3.
Figure 5:
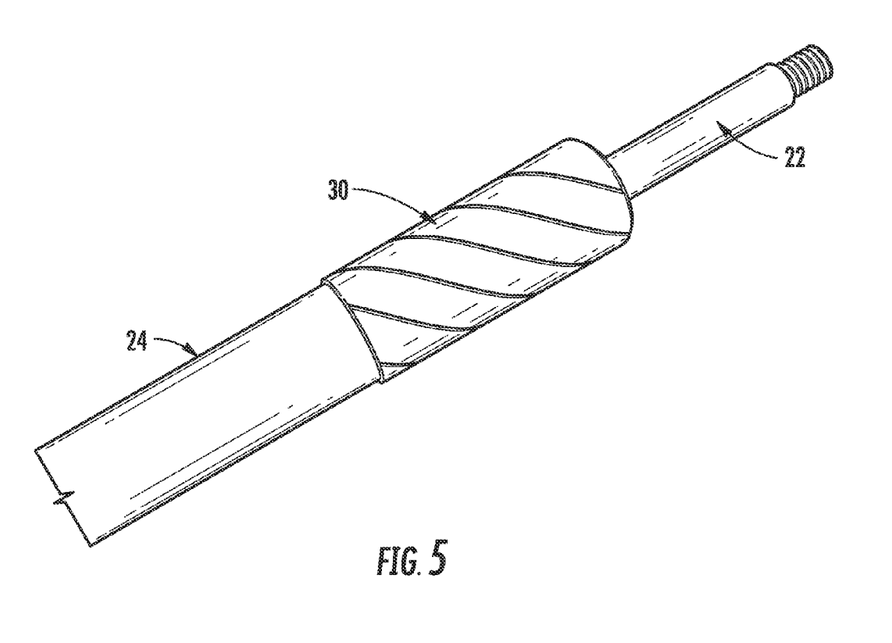
FIG. 5 is a close-up view showing magnetostrictive stripes located on the waveguide blade of FIG. 2.

With additional reference to FIGS. 3-5, the waveguide blade 12 is preferably made of a nickel-chromium alloy having good oxidation resistance at high temperatures and resistance to chloride ion stress-corrosion cracking, corrosion by high-purity water, and caustic corrosion. A preferred alloy is available under the tradename INCONEL-600 from ESPI Metals of Ashland, Oregon. Alternative blade materials include titanium and titanium based alloys. The blade 12 is configured to have a central mounting stud 22, a central body section 24 that is substantially circular in cross section, and a tapered end section 26 opposite the mounting stud 22.

The stud 22 is located along the central axis of the blade 12 to minimize its rotational inertia and consequent torsional wave damping and/or reflection. The tapered end section 26 is preferably formed by repeated draw-and-anneal processing and is shaped to have a cusped diamond profile 28 (FIG. 4) with an aspect ratio of 2.7 and a major diameter of 6 mm. That is, the end section 26 tapers into the long straight blade forming an acoustic horn and minimizing the energy loss between the round and cusped diamond shapes of the waveguide.

In this regard, it has been observed that level measurement sensitivity may be enhanced by maximizing the ratio of the torsional inertia of the fluid surrounding the waveguide as compared to the torsional inertia of the waveguide itself. It has also been observed that limiting the major dimension of the blade 12 to less than 10 mm avoids the generation of dispersive torsional ultrasonic modes. The end section 26 of the blade 12 is preferably attached to the body section 24 by butt-welding providing a stiff joint that effectively transmits the ultrasonic wave across it The waveguide blade 12 further includes a plurality of helically symmetric magnetostrictive stripes 30 located on an upper portion of the body section 24 adjacent the mounting stud 22 (FIGS. 3 and 5). The magnetostrictive stripes 30 are made of metal alloy rigidly attached to the body section 24, such as by vacuum brazing. For example, the stripes 30 may be vacuum brazed to the surface of the waveguide using a high temperature 82% Au-18% Ni braze. The stripes 30 are provided of sufficient thickness to provide a 50 kHz magnetic field to ensure effective guiding of the magnetic flux along their length. Due to the high temperature conditions of the reactor, the alloy used for the stripes 30 desirably remain magnetically stiff at the reactor temperatures. Cobalt and nickel-cobalt alloys are magnetically stiff at 350° C. and may be utilized. For example, nickel-cobalt alloys having from about 18 to about 30 weight percent cobalt have been observed to be useful for this purpose.

Figure 6:
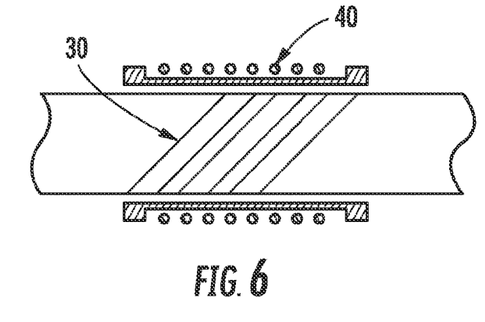
FIG. 6 is a cross-sectional view showing magnetostrictive stripes of the waveguide blade relative to a magnetostrictive send/receive coil of the system.

Returning to FIG. 2, the electrical assembly 14 of the transducer 15 includes a magnetostrictive send/receive coil 40 and a magnetostrictive bias coil 42 that surrounds the portion of the waveguide blade 12 having the magnetostrictive stripes 30. Each is specially configured to withstand the temperature and pressure conditions of the reactor within which they are to be used. FIG. 6 shows the relationship between the send/receive coil 40 and the magnetostrictive stripes 30.

Figure 7:
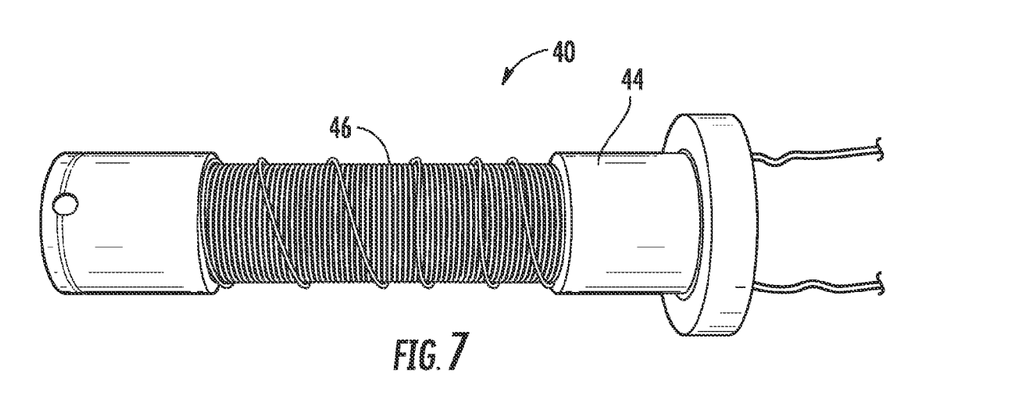
FIG. 7 shows a magnetostrictive send/receive coil of the system.

The magnetostrictive send/receive coil 40 is provided by an electrically insulative bobbin 44 having wire 46 coiled around the bobbin 44. The bobbin 44 is configured to have a central section of decreased diameter to receive the wire 46. The bobbin 44 is made of fully dense, hard fired alumina and the wire 46 is green-state-ceramic coated copper wire or other high temperature wire. FIG. 7 shows the hard fired alumina bobbin 44 and its green state ceramic wire 46 coil prior to assembly and firing. The alumina bobbin 44 is manufactured by high-pressure molding followed by high temperature firing.

With reference to FIG. 2, the magnetostrictive bias coil 42 provides a static magnetic bias to the magnetostrictive stripes 30, and is provided by a nonmagnetic metal bobbin 50 having a wire 52 coiled around the bobbin 50. The bobbin 50 may be made of stainless steel and the wire 52 may be the same as the wire 46.

Figure 8:
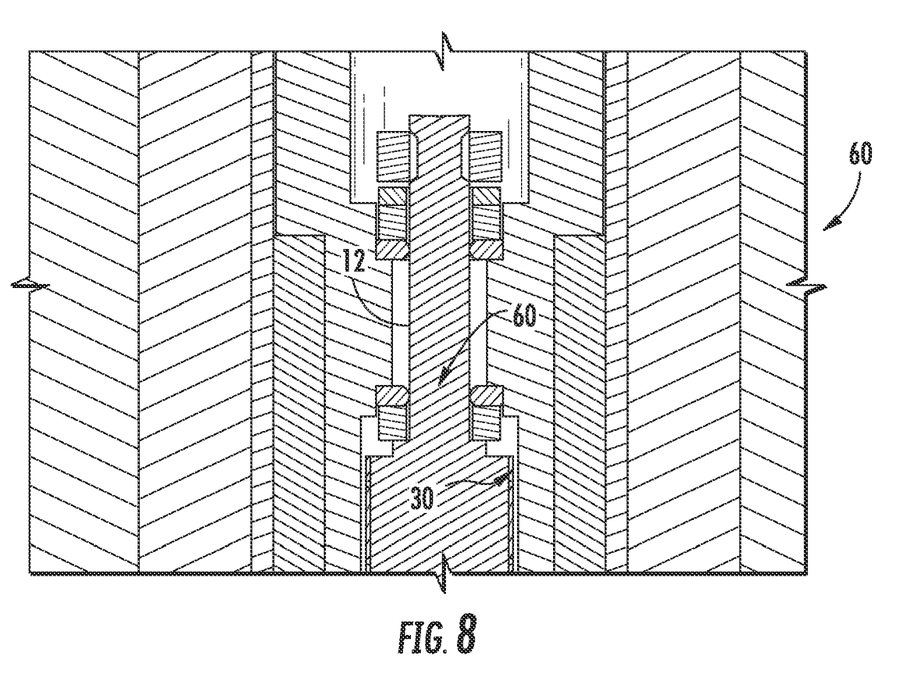
FIG. 8 is an enlarged view of a portion of FIG. 2 showing bearing components used t mount the waveguide blade.

With reference to FIG. 8, the transducer 15 utilizes a rotating bearing assembly 60 to alleviate torsional binding within a head portion 62 of the transducer 15. The bearing assembly 60 utilizes components made of sapphire and steel which are suitable to withstand the temperature and pressure of the reactor. The bearing assembly 60 is secured within the electrically insulative bobbin 44 and receives and holds the mounting stud 22 of the waveguide blade 12.

Figure 9:
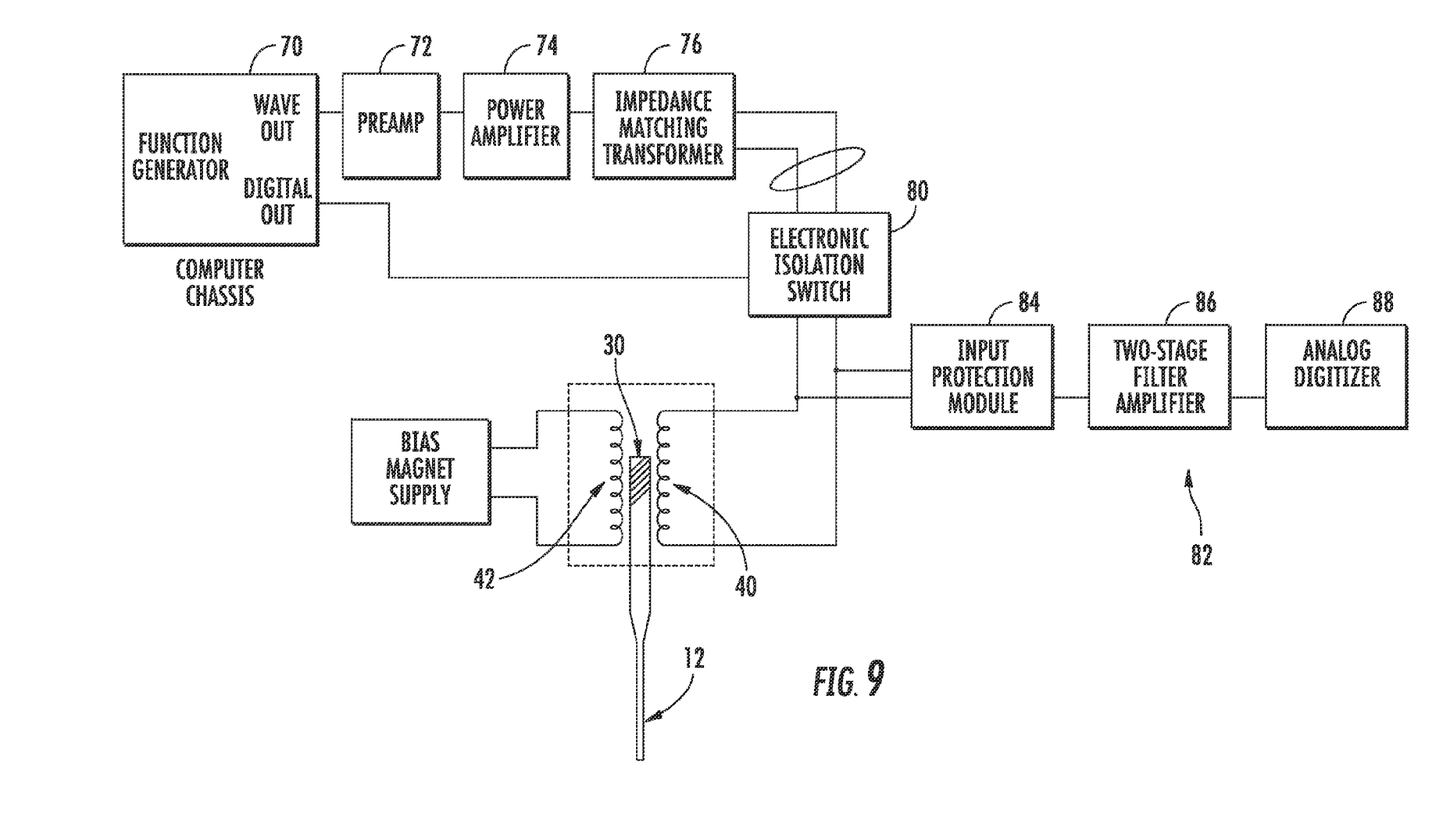
FIG. 9 is a block diagram of a level measurement system according to the disclosure.

A block diagram of the measurement system 10 having the ultrasonic waveguide blade 12, the magnetostrictive electrical assembly 14, and the external signal processing system 16 is shown in FIG. 9. The signal path of the electronics system 16 in FIG. 9 flows from left to right. The system 16 functions to drive a high current, windowed sine-wave pulse through the magnetostrictive send/receive coil 40 of the electrical system 14 for transmission through the waveguide blade 12, then from the same coil 40, receive the returning echo signal, which is amplified, filtered, and converted to a digital representation for software processing.

Features and advantages of the system 16 include: (a) additional signal amplification between the function generator and the power amplifier to drive the power amplifier to full amplitude; (b) a solid-state isolation switch implemented between the impedance matching transformer and magnetostrictive coil, which provides accurate switching times; (c) a receiver input protection stage provided to prevent the receiver's input transistors from going into deep saturation, which advantageously allows faster recovery after the excitation pulse; and (d) provision of a two-stage, high-impedance filter-amplifier with integral high and low pass filters and finely adjustable filter parameters and gain settings to enable direct control of out-of-band noise and baseline restoration.

The system 16 has a pc-based function generator 70 that utilizes data acquisition hardware and software, such as data acquisition software available under the tradename LABVIEW from National Instruments of Austin, Tex., to produce a desired windowed sine wave. The shape of the sine wave is provided by the software and hardware, and the software also provides the synchronization timing to initiate the pulse. The pulse signal preferably has duration of about 100 is and peak amplitude of about one volt. The pulse signal from the function generator 70 is sent through a preamplifier 72 and doubled in amplitude before going to a power amplifier 74.

A preferred preamplifier 72 is model DMP-3, 2-channel preamplifier, 20 Hz to 80 kHz bandwidth, available from M-Audio. A preferred power amplifier 74 has a frequency response to 1 MHz, such as model 3362, dual channel preamplifier, tunable high-pass and low-pass active filters (4-pole Butterworth or Bessel), adjustable gain 0 dB to 70 dB per stage, available from Krohn-Hite Corporation of Brockton, MA. The power amplifier 74 has variable gain and can be set to provide the maximum output without significant waveform distortion.

An impedance matching transformer 76 is provided to couple the power amplifier's output to the magnetostrictive coil 40. The transformer 76 preferably has selectable turns-ratios (10, 5, 2.5, and 1.25). It has been observed that maximum drive is obtained using the 5:1 ratio. A preferred transformer is Model MT56R transformer available from Krohn-Hite Corporation.

The function generator 70 preferably generates a "windowed" sine wave excitation signal. Windowing is a technique to restrict the time space of a function by multiplying an input function by another that is zero valued except for within a particular interval (window). The width of the window and the shape of its rising and trailing edges define the characteristics of the window. The system 16 preferably employs a Blackman window that passes a few periods of the primary sine wave. It has been observed that the fundamental torsional mode of the waveguide should be non-dispersive, so a reflected wave shape will be the same as the excitation wave shape. Signal filtering may be employed to recognize the specific wave shape and to extract signals with this characteristic from a noisy measurement.

The reflected stress waves dynamically change the length of the magnetostrictive stripes 30 within the coil 40. Changing the length of the magnetostrictive stripes 30 changes the shape of its magnetic field. The change in shape of the magnetic field induces a voltage on the magnetostrictive coil 40 surrounding the stripes 30, such that the coil 40 measures the reflected signal.

Figure 10:
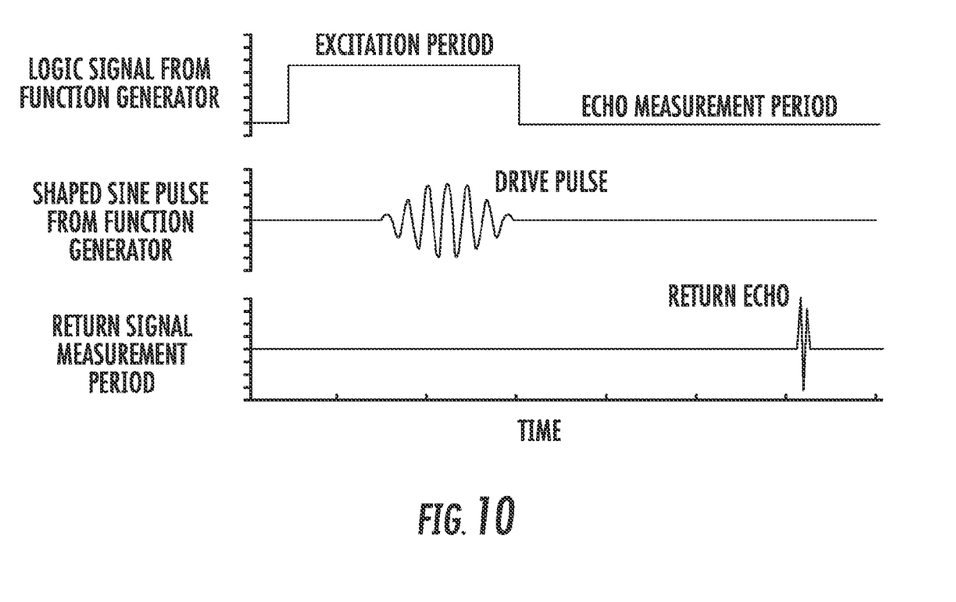
FIG. 10 depicts a timing sequence of signals associated with the system of FIG. 9.

An electronic switch 80 follows the matching transformer 76 to isolate the power amplifier 74 from the sensitive measurement circuit during the return echo period. The electronic switch 80 functions to sequentially connect the power amplifier 74 when the shaped sine wave is applied to the magnetostrictive transducer 15 and to electrically isolate the power amplifier 74 during the period when the return echo signals are measured. The sequencing of the pulse and switch, which is determined by software, is shown in FIG. 10.

The return echo torsional waves are picked up by the send/receive coil 40 and converted to a voltage signal. The actual return echo signal is a few millivolts; however, the excitation pulse can be up to 100 V peak (or higher). A limiting circuit 82 having an input protection module 84, a two-stage filter-amplifier 86, and an analog digitizer 88 is preferably utilized to buffer the connection between the send/receive coil 40 and the input of the preamplifier 72.

The low-level, returning echo signal is amplified by the filter-preamplifier 86 having tunable active filters. The channels are wired in series with a high-pass and low-pass filter assigned respectively to each channel. Using this preamplifier-filter combination, a pass-band is set for the range of about 30 kHz to 70 kHz. The typical sine-wave frequency used is in that range. The filter placed in the preamplifier easily removes out-of-band noise and allows rapid restoration of the dc value of the waveform following an excitation pulse.

The output of the filter-amplifier 86 is adjusted by the several gain settings to deliver a 2 V peak-to-peak signal to the analog digitizer 88, which allows analog-to-digital conversion up to but not exceeding the maximum range of the digitizer. The digitized signals are processed by the software to extract the time-of-flight of the torsional return echo using pattern matching algorithms. The return echo signal generated by the magnetostrictive transducer 15 is at most several millivolts at the terminals of the coil 40. However, the broadband output noise from the power amplifier 74 is about 10 mV not including other noise contributions at the amplifier's input such as from the output of the function generator 70. The output impedance of the power amplifier 74 is about 10Ω, which is lowered to about 3Ω on the secondary of the impedance matching transformer 76 (with 10:1 turns ratio).

Figure 11:
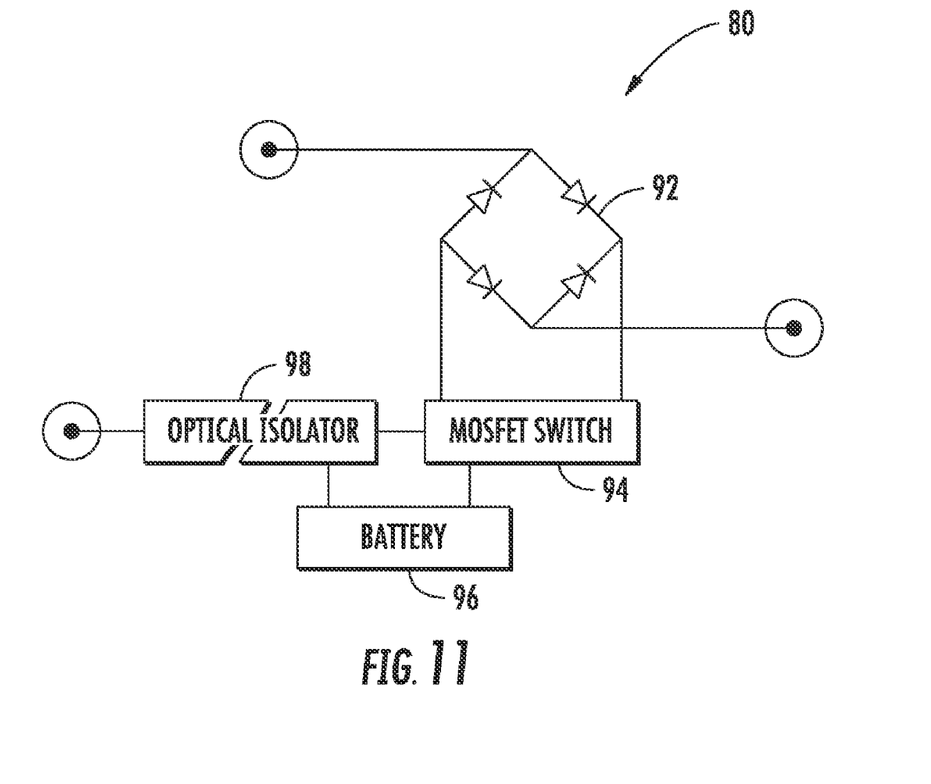
FIG. 11 is a schematic diagram of a power switch utilized in the system.

The noise corruption and shorting effect of the power amplifier 74 on the transducer output is compensated for by the use of the electronic isolation switch 80 (FIG. 9 and FIG. 11) that connects the power amplifier 74 to the magnetostrictive coil 40 during the drive pulse but disconnects it during measurement of the return echo. With reference to FIG. 11, the isolation switch 80 includes a diode bridge circuit 92, a MOFSET (metal-oxide-semiconductor field-effect transistor) switch 94, a battery 96, and an optical isolator 98. Other isolation circuits may be used such as multiple MOSFETs in a bridge configuration or fast-acting mechanical switches such as reed relays.

The output of the power amplifier 74 is routed through the diode bridge circuit 92. With the MOSFET switch 94 not conducting, neither positive- nor negative-going drive signals make it to the output 100 since one diode in the path becomes reversed biased for either half of the cycle. Input and output, however, are connected when the MOSFET switch 94 is conducting. The voltage at the output of the switch 80 is the same as at the input of the switch 80 minus two forward voltage drops across the diodes and the voltage dropped across the MOSFET switch 94. With a current of 5 A, the MOSFET switch 94 drops about 1.5 V. Therefore, the total potential drop across the switch circuit is about 3 V or 3% out of 100 V. Diodes only conduct when the forward voltage is greater than about 0.7 V. The step effect generates added harmonic energy near zero crossings of the drive signal. This added harmonic content from the diodes represents about 1.4% or 37 dB down, which does not cause drive problems.

The dc current provided by the switch 80 pretensions the coil 40 into its highest mechanical response per amount of magnetic flux change. It has been observed that the maximum echo signal results from a current of about a third of an ampere.

The switch 80 function is triggered by a logic signal input. Logic 1 (positive 3 V or more) causes conduction of the switch 80. Logic 0 turns off the switch 80. This logic input trigger is electrically isolated from the switch, diodes, and power drive signal allowing the switch circuit to float with respect to signal ground. The optical isolator 98 accomplishes the isolation. Because of the need for isolation, the MOSFET switch circuit is internally powered by the battery 96, which is preferably a 9 volt battery. An alternative powering method can be an isolated power supply that is operated from line current.

The switch 80 receives timing from the logic output of the function generator 70. The timing logic is set to turn on the MOSFET switch 94 when the drive signal is present and turn to off during the echo period. Thus, the unwanted noise and loading of the power amplifier 74 are greatly reduced during the measurement period.

The input protection module 84 (FIG. 9 and FIG. 12) is provided to avoid damage to the input circuits of the filter-amplifier stage. The module 84 includes 2 kΩ series resistor 102 and a pair of low-leakage diodes 104, which are preferably silicon diodes.

Figure 12:
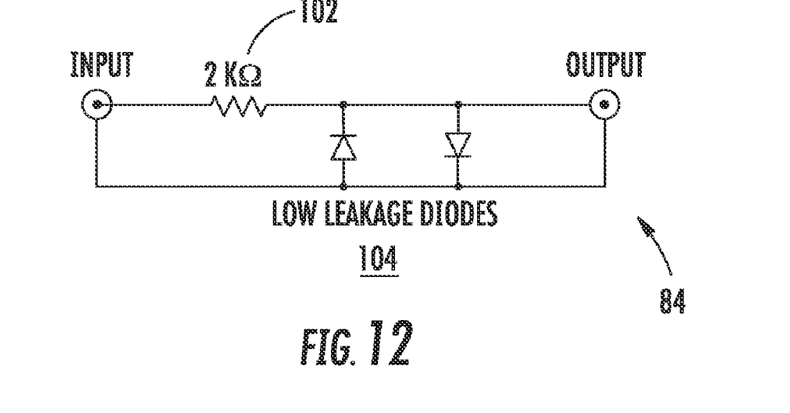
FIG. 12 is a schematic diagram of an input protection circuit utilized in the system.

The pulse signal from the power amplifier 74 can reach more than 100 volts during the excitation pulse, which can cause a failure of the input transistors of the first stage of preamplification. The input impedance of the preamplifier 72 is 1 MΩ in parallel with 100 pF capacitance. At 50 kHz, the impedance is about 31 kΩ. The 2kΩ series resistor 102 and the 31 kΩ input impedance of the preamplifier 72 form a voltage divider that attenuates the signal by about 6% or about 0.5 dB, which is a negligible loss.

The drive signal from the power amplifier 74 supplies current to both the magnetostrictive send/receive coil 40 and the input side of the limiting circuit 82, as they are in parallel. The impedance of the circuit of the magnetostrictive coil 40 is less than 20Ω. During the period that the drive signal exceeds the forward voltage drop of low-leakage diodes 104 (about 0.7 V), the ratio of current in the magnetostrictive coil 40 to the 2 kΩ resistor 102 of the protection circuit 100 is 100-to-1. This ratio represents a less than 0.1 dB loss of drive to the coil, which is negligible.

The back-to-back diodes 104 ensure that the output voltage to the input of the preamplifier 72 is less than 2 V (peak-to-peak) at all times. Once the drive pulse is finished, in which the large amplitude signal is clipped by the diodes 104, the return echo signal passes through to the preamplifier 72, being less than the forward voltage drop of the diodes 104. The diodes 104 have a fast recovery time of about 1.5 µs is so that the saturation effect of the drive pulse does not extend into the return echo period. The capacitance of the diodes 104 is less than 4 pF, which is negligible compared with preamplifier input capacitance.

The diodes 104 have a reverse leakage current of less than 1 nA at room temperature. The diode leakage represents a noise floor more than 40 dB down from the return echo signals and is, therefore, not a major contributor to noise on the echo signal.

In operation of the system 10, a steady current is applied to the bias coil 40 to bring the magnetostrictive stripes 30 into a state of magnetic stress where they have maximal length change per unit applied magnetic field. A time-windowed sine-wave voltage is then applied to the send/receive coil 40 generating a transient magnetic field within the bore of the winding. Magnetic field lines within the coil 40 are coupled into the magnetostrictive stripes 30. The stripes 30 lengthen synchronously with the current application to the coil 40. Torsional wave pulses are generated in the upper region of the waveguide blade 12 and transferred through the length of the waveguide blade 12. The surrounding coolant fluid influences the speed of the torsional wave pulse as described previously. The torsional wave pulse reflects off the distal end of the waveguide blade 12 and returns up the waveguide blade 12 to the magnetostrictive stripes 30. The surrounding fluid influences the speed of the return torsional wave pulse. The magnetostrictive stripes 30 change dimension and thereby modify the external magnetic field shape. The change in the external magnetic field shape impresses a voltage on the coil 40. This change in flux produces a voltage across the coil 40 which is measured and time correlated to the drive signal to provide information about the level of the coolant fluid.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A level measurement system suitable for use in a high temperature and pressure environment to measure the level of coolant fluid within the environment, the system comprising:

a vessel defining a high temperature and pressure environment containing a coolant fluid;

an ultrasonic waveguide comprising a plurality of magnetostrictive stripes positioned within the high temperature and pressure environment so that a portion of the waveguide is surrounded by the coolant fluid;

a magnetostrictive electrical assembly located within the high temperature and pressure environment and configured to operate in the environment and cooperate with the waveguide to launch and receive ultrasonic waves along the waveguide, the magnetostrictive electrical assembly comprising a magnetostrictive send/receive coil and a magnetostrictive bias coil that surround the portion of the waveguide having the magnetostrictive stripes; and an external signal processing system located outside of the high temperature and pressure environment and configured for communicating with the electrical assembly located within the high temperature and pressure environment;

wherein speed of the ultrasonic waves along the waveguide is proportional to the density of the coolant fluid surrounding the waveguide, and the level thereof, is obtained by measuring the transit time for the ultrasonic wave to progress down the waveguide and reflect back to the magnetostrictive electrical assembly.

2. The system of claim 1, wherein the external signal processing system comprises an ultrasonic wave generator operable to generate a pulse signal corresponding to the ultrasonic wave, an amplifier that increases the amplitude of the pulse signal, a transformer operable to couple the pulse signal to the magnetostrictive coil for transmission through the waveguide.

3. The system of claim 2, wherein return echo signals results from transmission of the pulse signal through the waveguide and the external signal processing system is further operable to receive the returning echo signals.

4. The system of claim 3, wherein the returning echo signals are transmitted through the waveguide to the magnetostrictive stripes which changes the length of the magnetostrictive stripes to induce a voltage on the magnetostrictive coil surrounding the magnetostrictive stripes to enable the magnetostrictive coil to measure the returning echo signals.

5. The system of claim 1, wherein in operation of the system, a steady electrical current is applied to the magnetostrictive coil to bring the magnetostrictive stripes into a state of magnetic stress, a time-windowed sine-wave voltage is applied to the magnetostrictive coil to generate torsional wave pulses and transfer the torsional wave pulses through the length of the waveguide, and wherein the coolant fluid surrounding waveguide influences the speed of the torsional wave pulse and the torsional wave pulses reflects from the waveguide and return up the waveguide to the magnetostrictive stripes, and wherein as a result the magnetostrictive stripes change in dimension resulting in the production of a voltage across the magnetostrictive coil which is measured and time correlated to the drive signal to provide information about the level of the coolant fluid.

6. The system of claim 1, wherein the vessel comprises a nuclear reactor.

7. The system of claim 1, wherein the high temperature and pressure environment comprises a temperature of about 330 degrees C. and a pressure of about 15 Mpa.

8. The system of claim 1, wherein the waveguide comprises a blade having a tapered end section has a cusped diamond profile.

* * * * *